Sept. 25, 1962      A. GEMMI      3,055,789

PROCESS OF JOINING CARBON BODIES

Filed July 1, 1959

INVENTOR
ANGIOLO GEMMI
BY
ATTORNEYS

United States Patent Office 3,055,789
Patented Sept. 25, 1962

3,055,789
PROCESS OF JOINING CARBON BODIES
Angiolo Gemmi, Terni, Italy, assignor to Elettracarbonium S.p.A., Milan, Italy, a company of Italy
Filed July 1, 1959, Ser. No. 824,334
Claims priority, application Italy July 18, 1958
8 Claims. (Cl. 156—327)

This invention refers to a method of producing joints between carbon bodies or graphite bodies or between such bodies and metal parts by means of a joining substance which fills the gaps and is transformed by coking in a joint. It is the aim of this invention to obtain by means of the joining substance an electric contact of the parts joined together, which contact is better than that obtained by means of a conventional cement, and to obtain a higher mechanical resistance for the joints.

It is known that the continuous working of electric furnaces requires the electrodes—which undergo consumption—to be extended by new electrodes.

To connect the electrodes together, cylindrical or cone-shaped joints are used which consist of a nipple to be screwed in the ends of the electrodes, or the electrodes are directly screwed together with the screw cap and the socket. These joints are however always the mechanically and electrically weakest points of the whole electrode length since there happens a heavy local overheating due to the electric transition resistance, so that a break in the electrode may occur due to the abnormal extension with all the rather disturbing consequences. Furthermore, these joints easily may become loose owing to vibrations of the furnace. These vibrations may easily cause the screw joint to become loose, so that the two front surfaces of the electrodes will be in loose contact thus causing an overheating of the joints which increases the consequences above referred to.

To improve the joints of electrodes or other carbon bodies, it is usual to employ a cement or a filling material containing cokable binders such as tar, pitch, plastic material or similar substances. Such binders are mixed with a filling powder of high electric conductivity, for instance a carbon powder, a graphite powder, or a metal powder, and give to the cement or filling material the conductivity required. Before screwing and fixing the electrodes together, the surfaces to be jointed are coated with the cement or filling material, so that the gaps between the surfaces to be connected are filled as much as possible when the binder is coked thus decreasing the electric resistance of the joints and obtaining a mechanically resistant connection which does not become loose.

This method only provids a partial improvement because the conventional cements are partly absorbed by the porous structure of the carbon or graphite bodies to be connected, while during the coking process the volume of the cement is greatly reduced since the volatile components are withdrawn, so that cracks are formed in the joint thus lessening the mechanical resistance as well as the electric conductivity of the joint.

The foregoing considerations for electrode joints are valid also for other joints of carbon material for which cement or filling substance are usually employed to fill the gaps between joints, e.g. between carbon blocks for lining electric furnaces, or to fix conductor bars which are inserted in preformed grooves in carbon blocks. It is clear that the thicker the cement layer the greater the danger of cracks originated by high temperatures, and the worse the contact. With the use of conventional cements or filling materials, there wall always be a decrease of volume during coking. Consequently, at the points requiring the best contact at high temperatures, the contact is worsened by cracks and gaps caused by the decrease of volume of the cement.

To diminish the harmful effect of the decrease of volume, it is known to use cements having a lower percentage of binding components, and to fill the gaps with cement under pressure. But even in this way it is impossible to avoid a part of the binder being absorbed by the porous structure of the bodies to be connected, so that the contact becomes loose. Besides, it is difficult to use cements of this type.

The present invention relates to the production and the use of a cement and filling material made from a conductive substance, which does not show a decrease of volume when baked, and fills all cracks and gaps if electrodes or carbon blocks are joined together or with metallic contact parts.

According to the invention, this is accomplished by using for joints between carbon or graphite bodies or between such bodies and metal parts a cement containing graphite derivates such as graphitic acid or graphite oxides or halogen derivates of graphite or addition products of graphitic acid with metals (metal salts) or the so-called graphite esters. Such a cement will swell up if the joint is heated thus increasing the contact pressure of the connected parts. There are certain graphite compounds, for instance the so-called graphitic acid or graphite oxide, which have a not yet fully known structure and will swell up when heated. These compounds are obtained by subjecting graphite to the action of concentrated sulphuric acid in the presence of oxidizers such as nitric acid or potassium chlorate. A graphitic acid is obtained for instance when for 4 days at room temperature a mixture of 4 parts of natural graphite in laminae of suitable granulation is treated with 2 parts of concentrated sulphuric acid and 1 part of a 60% nitric acid.

If the graphitic acid thus obtained is heated to temperatures higher than 200° C., its volume increases permanently with respect to the volume at room temperature. Graphitic acid is a dry powder. The swelling is believed to be due to an expansion of the interlaminar spaces resulting from the action of hydrogen and oxygen.

For the purpose of this invention, all graphite compounds are suitable if they swell up when heated. These compounds may be used alone or mixed with other fillers of good electric conductivity, such as carbon powder, graphite powder, metal powder. Organic binders such as pitch, tar, plastic materials, or even inorganic binders such as alkaline silicates do not disturb the swelling of the graphite derivates.

The use of organic carbonizable substances in the mixtures described hereafter make these substances become coke at coking temperatures of up to 400° C. and 600° C. thus making the swollen structure stronger.

The importance of the cement or filling material according to this invention, which swells under the action of heat and consists e.g. of graphitic acid and organic binders, becomes particularly clear if its behaviour is compared with that of conventional cements. If the expansion of the filler can be a complete one, this produces a pressure against the surfaces to be connected, and the resilient behaviour may be compared with that of a stretched spring. In such a way, the contact becomes better and remains unaltered even with high temperatures. This behaviour is rather important if higher temperatures produce a thermic expansion thus causing both contact surfaces to move away from each other.

When using between the contact surfaces a filler according to this invention, the contact remains resilient and a good electric as well as mechanical and thermical contact is assured.

The following examples described cements and fillers according to this invention with respect to their composition as well as to their use. These axmples are of course only indicative and do not give any limit whatsoever of the invention.

*Example 1*

Figure 1:
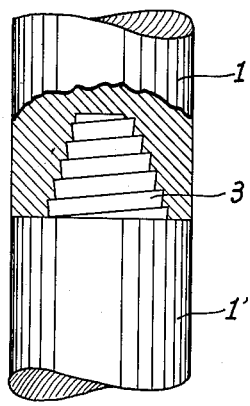
FIG. 1 shows a connection of carbon electrodes with a cone-shaped thread for continuously working electric furnaces.

In FIG. 1, the carbon electrodes 1 and 1' for electric furnaces of the type employed for manufacturing calcium carbide, ferroalloys, metallic silicon, etc. are joined together by means of a coneshaped thread. The cement, which is used to patch a new electrode on the consumed one, is semi-liquid, i.e., mastic and is carefully spread on the surfaces which have to come into contact.

This cement is composed e.g., in equal parts of a natural graphite transformed as described in graphitic acid, and a liquid phenol resin diluted with alcohol as a binder. If both electrodes are tightly screwed together with the aid of the cement, the desired effect of the cement is obtained when the joint is heated, because the transition resistance produces with the flow of the current a temperature sufficient to coke the cement so that all spaces are filled. The result is a good electrical and mechanical connection having properties which do not essentially differ from those of the electrodes to be joined together.

*Example 2*

Figure 2:
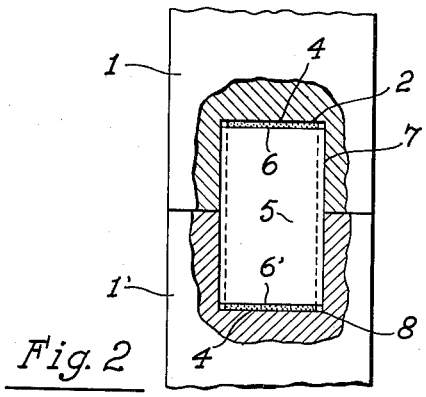
FIG. 2 shows the connection of graphite electrodes by means of a cylindric graphite nipple.

In FIG. 2, preformed discs 2 and 8 are inserted between the bases of the nipple boxes 4 of the electrodes 1 and 1' and the front surfaces of the nipple 5 with the thread 7. The said discs are obtained and prepressed for instance from a mixture of equal parts of graphitic acid, graphitic oxide and pitch. These discs, which will swell up when the electrodes burn in the furnace, prevent the unscrewing of the electrodes and increase the electric conductivity of the joint.

*Example 3*

A cement—consisting of one third of pretreated graphite, one third of anthracite the gas of which has been eliminated, and one third of pitch—is employed to fill the gaps between carbon blocks used for the lining of electric furnaces, dome furnaces and blast furnaces, so that high temperatures, as they happen often in practice, do not cause cracks through which liquid metal or slag might pass.

Furthermore, these fillers compensate thanks to their resilient properties the elongation stresses which are a result of thermical causes. In this case, the cement may be employed by spreading the warm substance 9 on the surfaces to be connected or filling granules of this substance in the gaps between the blocks to be joined, or laying preformed thin plates (laminae) of the cement between the blocks when they are built in.

*Example 4*

Figure 3:
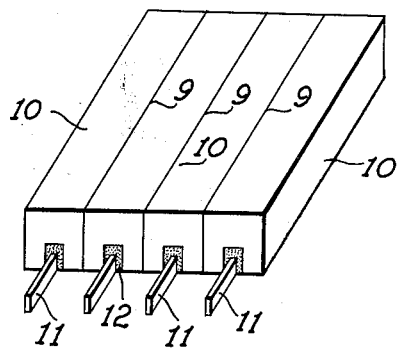
FIG. 3 shows the use of the cement for the cathode block lining for baths for the electrolysis of fused aluminum.

FIG. 3 shows the use of the cement to produce a cathode block lining for baths for the electrolysis of fused aluminum. A cement of the kind described in example 3 makes the joints 9 of the cathode blocks 10 essentially better and safely prevents the liquid metal from entering the gaps between the blocks.

FIG. 3 shows the use of a cement 12 having the effect of producing a safe contact of the conductor bars 11 with the carbon blocks 10. In this case, the cement is composed of one third of electrographite in granules, one third of treated natural graphite (graphitic acid) and one third of pitch. The cement—which is employed in the usual way when inserting the conductor bar in the carbon blocks 10—causes at the high temperatures appearing later on not only a low drop in voltage between conductor bar 11 and carbon block 10, but provides also rather uniform contact conditions within all the conductor bars employed with the carbon blocks thus obtaining a rather uniform distribution of power on the whole bottom of the bath for the electrolysis.

Figure 4:
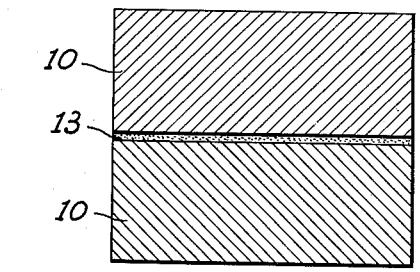
FIG. 4 shows a simple connection of two working electrodes horizontally disposed.

In many cases, a thin cement layer between the parts to be connected will be sufficient as shown in FIG. 4. This figure shows two carbon bodies 10 horizontally disposed which are joined together by means of the cement layer 13.

*Example 5*

Figure 5:
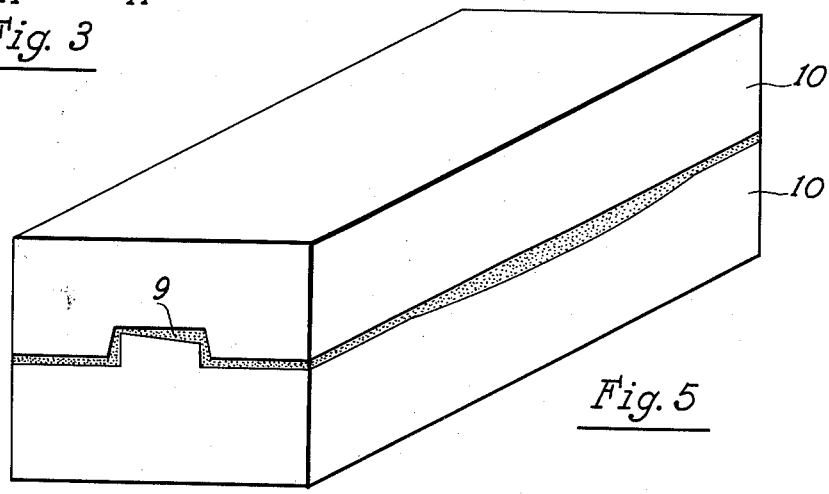
FIG. 5 is a perspective view of a connection of two carbon surfaces with roughly formed teeth.

The carbon bodies to be joined together may be provided with roughly prepared surfaces with teeth as shown in FIG. 5. The non-uniform gaps of the carbon blocks 10 are compensated for by the increase of the volume of the cement 9. Therefore, a good electric contact between both bodies is maintained. For this reason there is no necessity for a costly and exact machining of the surfaces to be brought into contact.

Up to now, the unevennesses of the surfaces in contact had to be compensated for by spreading a thick layer of so called "green" electrode substance. The plastic behaviour of the cement according to this invention makes such a compensation unnecessary.

What I claim is:

1. A process of joining bodies of which at least one is made from material selected from the class consisting of carbon and graphite, said process comprising the steps of bringing said bodies into juxtaposition with juxtaposed surfaces of said bodies defining a confined space therebetween, placing in said confined space a mass of a heat hardenable and heat expansible cement essentially comprising a material selected from the class consisting of graphitic acid, halogen derivatives of graphitic acid, addition products of graphitic acid with metals and esters of graphitic acid and a carbonaceous binder, and then heating the mass to a temperature sufficient to swell the material selected from the class consisting of graphitic acid, halogen derivatives of graphitic acid, addition products of graphitic acid with metals and esters of graphitic acids whereby to increase the contact pressure of the cement and the juxtaposed bodies and further heating the mass to a higher temperature sufficient to coke the carbonaceous binder.

2. A process as set forth in claim 1 in which the confined space is in the form of a disc.

3. A process as set forth in claim 1 in which the confined space is in the form of a lamina.

4. A process as set forth in claim 1 in which the confined space is in the form of a rod.

5. A process as set forth in claim 1 in which the binder is pitch.

6. A process as set forth in claim 1 in which the binder is a liquid organic resin.

7. A process as set forth in claim 6 in which the liquid organic resin is a phenol resin.

8. A process as set forth in claim 1 in which the graphitic acid constitutes from ⅓ to ½ of the cement.

References Cited in the file of this patent

UNITED STATES PATENTS

| | | |
|---|---|---|
| 2,093,390 | Wyckoff | Sept. 14, 1937 |
| 2,412,081 | Droll | Dec. 3, 1946 |